(12) United States Patent
Lee

(10) Patent No.: US 9,554,037 B2
(45) Date of Patent: Jan. 24, 2017

(54) ELECTRONIC APPARATUS FOR MAKING BOKEH IMAGE AND METHOD THEREOF

(71) Applicant: SAMSUNG ELECTRONICS CO., LTD., Suwon-si, Gyeonggi-do (KR)

(72) Inventor: Seung-ho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 145 days.

(21) Appl. No.: 14/242,155

(22) Filed: Apr. 1, 2014

(65) Prior Publication Data

US 2015/0116542 A1  Apr. 30, 2015

(30) Foreign Application Priority Data

Oct. 29, 2013  (KR) .......................... 10-2013-0129257

(51) Int. Cl.
| | |
|---|---|
| H04N 5/228 | (2006.01) |
| H04N 5/232 | (2006.01) |
| H04N 5/262 | (2006.01) |
| G06F 3/0484 | (2013.01) |
| G06T 11/00 | (2006.01) |

(52) U.S. Cl.
CPC ...... *H04N 5/23229* (2013.01); *G06F 3/04845* (2013.01); *G06T 11/00* (2013.01); *H04N 5/23216* (2013.01); *H04N 5/2621* (2013.01)

(58) Field of Classification Search
None
See application file for complete search history.

(56) References Cited

U.S. PATENT DOCUMENTS

2003/0053718 A1* 3/2003 Yamamoto .................... 382/305
2007/0030357 A1* 2/2007 Levien et al. ............ 348/211.14
2008/0303913 A1* 12/2008 Mertens ..................... 348/222.1
(Continued)

FOREIGN PATENT DOCUMENTS

EP  2 107 529 A2  10/2009
KR  20-0414237 Y1  4/2006
(Continued)

OTHER PUBLICATIONS

Hans@GPR, "Free-Form-Bokeh GIMP Plugin Registry," GIMP Plugin Registry, retrieved from internet website: http://registry.gimp.org/node/28052 on Mar. 6, 2015, 5 pages (Apr. 13, 2013).
(Continued)

*Primary Examiner* — Twyler Haskins
*Assistant Examiner* — Wesley Chiu
(74) *Attorney, Agent, or Firm* — Drinker Biddle & Reath LLP

(57) ABSTRACT

An electronic apparatus and a method for making a bokeh image are provided. The electronic apparatus includes an image photographing unit configured to photograph an image, a display configured to display a user interface (UI) to set a bokeh option on the image, and a controller configured to, when the image is divided into a plurality of areas on the UI, and a bokeh pattern is determined for each of the plurality of areas, generate a bokeh image by mapping the bokeh pattern determined for each of the plurality of areas to a light source point included in the respective each of the plurality of areas.

16 Claims, 13 Drawing Sheets

(56) References Cited

U.S. PATENT DOCUMENTS

| | | | |
|---|---|---|---|
| 2009/0289952 A1* | 11/2009 | Gotohda | G06F 3/04812 345/589 |
| 2010/0223568 A1 | 9/2010 | Quek et al. | |
| 2011/0280475 A1* | 11/2011 | Singhal | H04N 5/2621 382/162 |
| 2012/0113296 A1* | 5/2012 | Kunishige | H04N 5/23245 348/234 |
| 2012/0249836 A1* | 10/2012 | Ali et al. | 348/239 |
| 2013/0010184 A1* | 1/2013 | Lee | H04N 5/238 348/363 |
| 2013/0022290 A1* | 1/2013 | Hori | G06K 9/36 382/274 |
| 2013/0229435 A1 | 9/2013 | Intwala et al. | |
| 2013/0300760 A1* | 11/2013 | Sugano et al. | 345/592 |
| 2014/0368494 A1* | 12/2014 | Sakharnykh | G06T 5/004 345/419 |

FOREIGN PATENT DOCUMENTS

| | | |
|---|---|---|
| KR | 20-2011-0000048 U | 1/2011 |
| KR | 10-2011-0070662 A | 6/2011 |
| KR | 10-2013-0005883 A | 1/2013 |

OTHER PUBLICATIONS

Extended European Search Report issued for EP 14175335.0 (Mar. 18, 2015).

* cited by examiner

ELECTRONIC APPARATUS FOR MAKING BOKEH IMAGE AND METHOD THEREOF

CROSS-REFERENCE TO RELATED APPLICATION(S)

This application claims priority from Korean Patent Application No. 10-2013-0129257 filed on Oct. 29, 2013 in the Korean Intellectual Property Office, the disclosure of which is incorporated herein by reference in its entirety.

BACKGROUND

1. Field

Aspects of the exemplary embodiments relate to an electronic apparatus and a method for making a bokeh image, more particularly to an electronic apparatus which enables a user to easily make a bokeh image in various concepts and a method for making a bokeh image thereof.

2. Related Art

Recent development of an electronic apparatus and image photographing technology has enabled easier photographing of various images by using various image photographing apparatuses and electronic apparatuses having an image photographing function.

In particular, there are increasing needs that a user wishes to not only photograph a subject but also photograph an image with various effects, and add various effects on an image of a user.

Among the effects, there may be the out-of-focus effect. The out-of-focus effect is a method, while photographing a subject, of exactly setting a focus on a subject to make the subject photographed clearly, but not setting a focus on a background other than the subject, in order to concentrate a focus on the subject. Especially, while photographing an image with the out-of-focus effect, an area photographed with light may have a bokeh effect.

However, as to the conventional bokeh effect, the technology that is mainly used involves a filter that is mounted on a lens whereby the shape of an area where light is photographed is changed by changing a shape of the filter. Using this technology, it is only possible to realize a bokeh image including only one pattern in one image.

Therefore, there has been a need to photograph an image having various bokeh effects.

SUMMARY

An aspect of the exemplary embodiments is designed in accordance with the above-described considerations and is purposed to provide an electronic apparatus which enables a user to make a bokeh image in various concepts and a method for making a bokeh image.

According to an exemplary embodiment, an electronic apparatus includes an image photographing unit configured to photograph an image, a display configured to display a user interface (UI) to set a bokeh option on the image, and a controller configured to, when the image is divided into a plurality of areas on the UI, and a bokeh pattern is determined for each of the plurality of areas, generate a bokeh image by mapping the bokeh pattern determined for each of the plurality of areas to a light source point included in the respective each of the plurality of areas.

The UI may include a first UI part which displays a plurality of layouts and a second UI part which receives a selection of the bokeh pattern, wherein the controller, in response to one layout selected from among the plurality of layouts at the first UI part, may determine the plurality of areas based on a number and type corresponding to the selected layout, and in response to a plurality of bokeh patterns selected at the second UI part, may determine each selected bokeh pattern as a bokeh pattern determined for at least one of each of the plurality of areas.

The UI may include a UI part capable of user drawing, wherein the controller, in response to a first user drawing to divide the image performed at the UI part, may divide the image into the plurality of areas according to a first user drawing trace, and in response to a second user drawing to draw a pattern performed at the UI part, may determine the pattern drawn by the second user drawing as the bokeh pattern.

The apparatus may further include a storage, wherein the controller may store area division information determined by the first user drawing and bokeh pattern information determined by the second user drawing in the storage.

The apparatus may further include a communicator that performs communication with an external apparatus; wherein the controller transmits the area division information and the bokeh pattern information stored in the storage to the external apparatus.

The controller, in response to a light source point being in a format of a line, maps the bokeh pattern as a plurality of bokeh patterns according to the format of the line, and gradually changes transparency of the plurality of bokeh patterns according to brightness of the light source point along the format of the line.

The controller may automatically determine the plurality of areas according to any information of the image selected from the group consisting of distance information and depth information.

The bokeh pattern may include at least one pattern selected from the group consisting of a graphic image, a photo, a text, a symbol, and a number.

A method of making a bokeh image according to an exemplary embodiment includes photographing an image; displaying a UI to set a bokeh option on the image; dividing the image into a plurality of areas on the UI; determining a bokeh pattern for each of the plurality of areas; and generating a bokeh image by mapping the bokeh pattern determined for each of the plurality of areas to a light source point included in the respective each of the plurality of areas.

The UI may include a first UI part which displays a plurality of layouts and a second UI part which receives a selection of the bokeh pattern, wherein the determining includes, in response to one layout selected from among the plurality of layouts at the first UI part, determining the plurality of areas based on a number and type corresponding to the selected layouts, and in response to a plurality of bokeh patterns selected at the second UI part, determining each selected bokeh pattern as a bokeh pattern determined for at least one of each of the plurality of areas.

The UI may include a UI part capable of user drawing, wherein the determining comprises, in response to a first user drawing to divide the image performed at the UI part, dividing the image into the plurality of areas according to a first user drawing trace, and in response to a second user drawing to draw a pattern performed at the UI part, determining the pattern drawn by the second user drawing as the bokeh pattern.

The method may further include storing area division information determined by the first user drawing and bokeh pattern information determined by the second user drawing.

The method may further include transmitting the stored area division information and the bokeh pattern information to an external apparatus.

The generating the bokeh image may include, in response to a light source point being in a format of a line, mapping the bokeh pattern as a plurality of bokeh patterns according to the format of the line, and gradually changing transparency of the plurality of bokeh patterns according to brightness of the light source point along the format of the line.

The determining may include automatically determining the plurality of areas according to any information of the image selected from the group consisting of distance information and depth information.

The bokeh pattern may include at least one pattern selected from the group consisting of a graphic image, a photo, a text, a symbol, and a number.

According to various exemplary embodiments, a user may make a bokeh image in various concepts.

BRIEF DESCRIPTION OF THE DRAWINGS

The above and/or other aspects will be more apparent by describing certain exemplary embodiments with reference to the accompanying drawings, in which.

DETAILED DESCRIPTION

Figure 1:
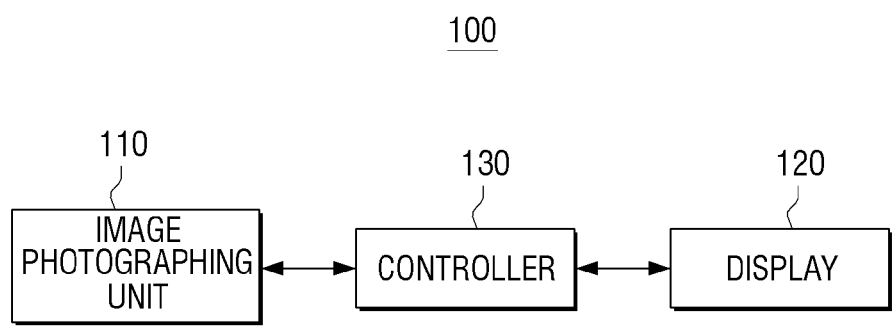
FIG. 1 is a block diagram briefly illustrating the configurations of an electronic apparatus, e.g., an image photographing apparatus, according to an exemplary embodiment.

Certain exemplary embodiments are described in higher detail below with reference to the accompanying drawings.

In the following description, like drawing reference numerals are used for the like elements, even in different drawings. The matters defined in the description, such as detailed construction and elements, are provided to assist in a comprehensive understanding of exemplary embodiments. However, exemplary embodiments can be practiced without those specifically defined matters. Also, well-known functions or constructions are not described in detail since they would obscure the application with unnecessary detail.

FIG. 1 is a block diagram briefly illustrating the configurations of an electronic apparatus, e.g., an image photographing apparatus 100, according to an exemplary embodiment. As illustrated in FIG. 1, the image photographing apparatus 100 includes a photographing unit 110, a display 120, and a controller 130. In this case, the image photographing apparatus 100 may be a camera, but this is merely exemplary, and also may be realized as various electronic apparatuses having the photographing unit 110 such as a mobile phone, a tablet PC, a digital camera, a camcorder, a notebook PC, a PDA, or the like.

The photographing unit 110 is an element to photograph an image. That is, the photographing unit 110 may receive an image of a subject by converting an optical signal input through a lens into an electric signal using an image sensor. In this case, a subject refers to all the objects which include a main subject within the generated photographing image and a background.

In particular, the photographing unit 110 may photograph light in a region of an image where focus of the image is not exact, as a round-shaped bokeh.

Meanwhile, the display 120 is an element to display an image photographed through the photographing unit 110 or an image stored in a storage. In addition, the display 120 may display a user interface (UI) to set a bokeh option on an image.

A bokeh option includes an option which divides an area of an image and an option which sets a bokeh pattern. That is, a UI for setting a bokeh option may include a UI for dividing an area of an image and a UI for setting a bokeh pattern. A bokeh pattern may include at least one of a graphic image, a photo, a text, a symbol, and a number. For example, the bokeh pattern may be a graphic image such as a shape of star, heart, crown, or the like; a photo of a person or a figure; or texts such as "A, B, HAPPY, LOVE".

Meanwhile, the display 120 may sequentially display an option which divides an area of an image and an option to set a bokeh pattern, from among bokeh options, or display the options concurrently. A detailed exemplary embodiment for a UI for setting a bokeh option will be described later.

The controller 130 is an element to control the overall operations of the image photographing apparatus 100. In particular, when an image is divided into a plurality of areas on a UI for setting a bokeh option, and bokeh patterns are determined for each area, the controller 130 maps each bokeh pattern to a light source point included in each divided area of the image and generates a bokeh image.

That is, the controller 130 extracts a light source point by using various modules stored in the storage. As described above, when a light source is photographed, a bokeh is formed. A light source point means an area where bokeh is formed by a light source within a photographed image. The controller 130 generates a bokeh image by mapping each light source point to a bokeh pattern by using a bokeh option which is input from a UI for setting a bokeh option.

In addition, from among UIs for setting a bokeh option, when a plurality of layouts which divide an image into various formats are displayed at a UI for dividing an area of the image, and when one of the plurality of layouts is selected by a user, the controller 130 may determine a plurality of areas of the image with a number and type corresponding to the selected layouts.

In addition, when a bokeh pattern in various formats is displayed at a UI for setting a bokeh pattern among UIs for setting a bokeh option, and one bokeh pattern among a plurality of bokeh patterns is selected by a user, the controller 130 may determine each selected bokeh pattern as a bokeh pattern corresponding to each of a plurality of areas.

That is, when a layout which divides an image into two equal parts in a vertical direction at a UI for dividing an area of an image is selected, and when a heart-shaped bokeh pattern and a star-shaped bokeh pattern are selected at a UI for setting a bokeh pattern, the controller 130 may make a bokeh image by mapping a heart-shaped bokeh pattern with a light source point detected from a left side of the image divided into two equal parts, and a star-shaped bokeh pattern with a light source point detected from a right side of the image divided into two equal parts. Each area of the image which is to be mapped to each bokeh pattern may be re-selected by a user through a UI for setting a bokeh option.

In addition, when a layout which divides an image into four equal parts at a UI for dividing an area of an image is selected, and when a heart-shaped bokeh pattern and a star-shaped bokeh pattern are selected at a UI for setting a bokeh pattern, the controller 130 may make a bokeh image by mapping, from among the four parts, a heart-shaped bokeh pattern at a part selected by a user or an arbitrary part and a star-shaped bokeh pattern at other parts of the image.

Meanwhile, regarding a UI for setting a bokeh option, a user drawing is available. That is, the UI, by using a touch panel, can receive a user drawing by a user's finger or a touch pen provided outside the image photographing apparatus 100, or the like.

When user drawing to divide an image is performed at a UI part, from among UIs for setting a bokeh option, the controller 130 may divide an image to a plurality of areas according to a user drawing trace.

When a user drawing is performed on a pattern at a UI part for setting a bokeh pattern, from among UIs for setting a bokeh option, the controller 130 may determine a pattern by a user drawing as a bokeh pattern.

That is, even though not selecting any one of a plurality of layouts displayed by a UI, a bokeh image may be generated by dividing an area for making a bokeh image into an arbitrary layout and drawing a bokeh pattern by a user drawing.

In addition, a UI for setting a bokeh option may receive a user command through another electronic apparatus. For example, when another electronic apparatus is a user's PC, and the user's PC communicates with the image photographing apparatus 100 by wire or wirelessly, the controller 130 may cause the user's PC to display a UI for setting a bokeh option. In addition, the controller 130 may control the user's PC to divide an area of an image and set a bokeh pattern by receiving a preset layout, a selected bokeh pattern, or a user drawing on an area and a pattern, through the user's PC.

Figure 2:
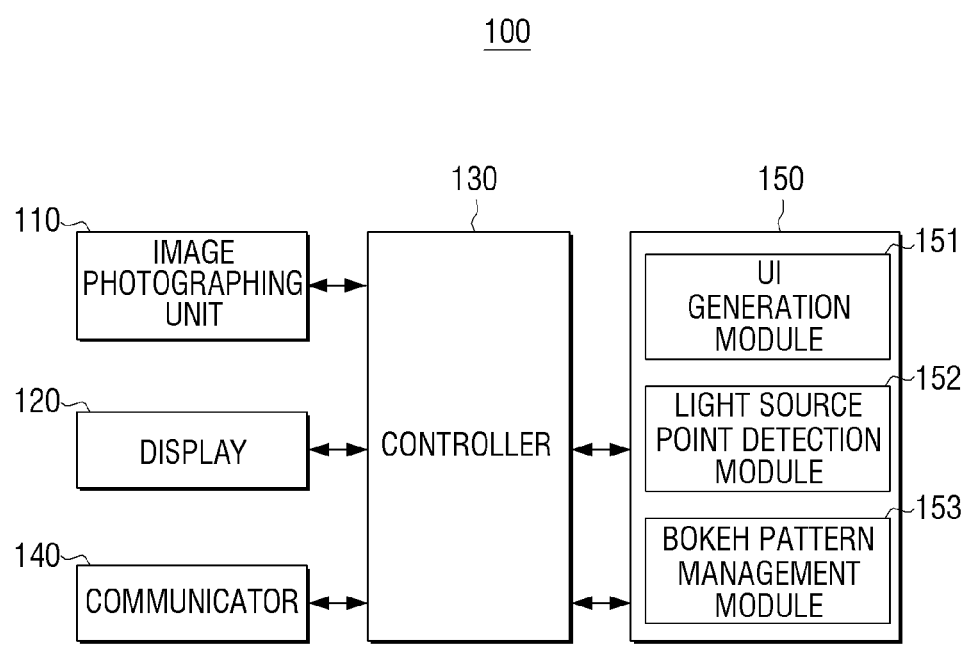
FIG. 2 is a block diagram illustrating the configurations of an electronic apparatus according to another exemplary embodiment.

FIG. 2 is a block diagram illustrating the configurations of an electronic apparatus according to another exemplary embodiment. The image photographing apparatus 100, as illustrated in FIG. 2, may further include the communicator 140 or the storage 150.

Meanwhile, FIG. 2 comprehensively illustrates various elements by taking an example of the image photographing apparatus 100 as an electronic apparatus having various functions such as communication function, visual image reproduction function, display function, photographing timing change function, UI display function for setting a bokeh option, and a bokeh image making function. Therefore, according to some exemplary embodiments, a part of the elements in FIG. 2 may be omitted or changed, or another element may be added.

Among the elements in FIG. 2, the elements that are the same as those illustrated in FIG. 1 will not be explained.

The communicator 140 performs communication with various types of external apparatuses according to various communication types. That is, the communicator 140 may include various communication chips including a Wi-Fi chip, a Bluetooth chip, a near field communication (NFC) chip, a wireless communication chip, or the like. In this case, the Wi-Fi chip, the Bluetooth chip, and the NFC chip respectively perform communications by using a Wi-Fi method, a Bluetooth method, and an NFC method. Among them, the NFC chip may indicate a chip operating with an NFC method which uses 13.56 MHz band, from among various RF-ID frequency bands such as 135 kHz, 13.56 MHz, 433 MHz, 860~960 MHz, and 2.45 GHz. In the case of using the Wi-Fi chip or the Bluetooth chip, various information may be transceived after connecting communications by using transceived connection information such as SSID and a session key, or the like. The wireless communication chip indicates a chip performing communication according to various communication standards such as IEEE, ZigBee, 3G (3rd Generation), 3GPP (3rd Generation Partnership Project), LTE (Long Term Evolution), or the like.

Meanwhile, the controller 130 may receive an image stored in an external apparatus through the communicator 140, and transmit an image stored in the storage 150 to an external apparatus through the communicator 140. In addition, the controller 130 may transmit image area division information and bokeh pattern information stored in the storage 150 to an external apparatus through the communicator 140. In other words, the controller 130 may control to transceive image area division information and bokeh pattern information through the communicator 140 so as to share an image area division layout and a bokeh pattern determined by a user's choice or drawing at an external electronic apparatus including another image photographing apparatus.

In addition, when image area division information and pattern information are input through another electronic apparatus, the controller 130 may control the communicator 140 to receive the input area division information and pattern information.

The storage 150 is an element to store various software modules and data, etc. to drive the image photographing apparatus 100. In particular, the storage 150 may store image area division information and bokeh pattern information determined by user drawing.

Specifically, examples of software which the storage 150 may store include a UI generation module 151, a light source point detection module 152, and a bokeh pattern management module 153.

The UI generation module 151 stored in the storage 150 is a module, executed by the controller 130, to generate and display a UI for setting a bokeh option. That is, the UI generation module is a UI for setting a bokeh option, which may generate a UI for dividing an area of an image and a UI for setting a bokeh pattern.

In addition, the light source point detection module 152 stored in the storage 150 is a module, executed by the controller 130, to detect a light source point included in an image. That is, the light source point detection module 152 may detect a light source point to map a bokeh pattern.

In addition, the bokeh pattern management module 153 stored in the storage 150 is a software module which is directly selected by a user or a software to manage a bokeh pattern input by a user drawing. That is, when the bokeh pattern management module 153 is executed by the controller 130, the bokeh pattern management module 153 may store a bokeh pattern which is selected by a user with high frequency in the storage 150. Afterwards, when a UI for selecting a bokeh option is displayed, the bokeh pattern management module 153 may recommend to a user a bokeh pattern selected with high frequency. As such, a bokeh pattern input by a user drawing may be stored and continuously used in the storage 150.

Meanwhile, when a light source point detected by the light source point detection module 152 is in a format of a line, the controller 130 may map a bokeh pattern as a plurality of bokeh patterns according to the format of the line, and gradually change transparency of the plurality of bokeh patterns according to brightness of the light source point along the format of the line. In addition, the controller 130 may control an image so that the image may be automatically divided into a plurality of areas according to distance information of the image or depth information of the image without selection of a layout or user drawing. Regarding this, a detailed exemplary embodiment will be described below.

By the image photographing apparatus 100 as described above, a user may divide an image into a plurality of areas and generate a bokeh image in which various bokeh patterns are mapped to each area.

Meanwhile, a method for making a bokeh image will be described with reference to FIGS. 3-8.

Figure 3:
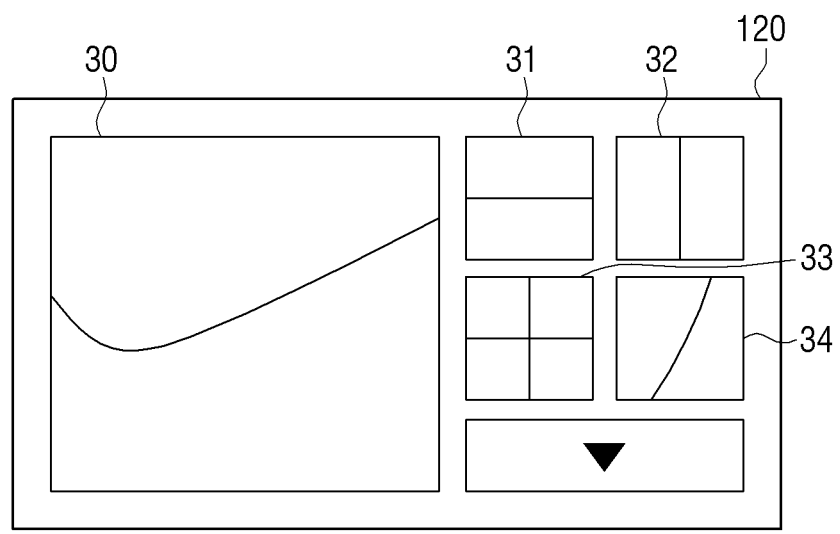
FIGS. 3-6 are views illustrating a user interface to determine an area of an image and a bokeh pattern according to various exemplary embodiments.

FIGS. 3-6 are views illustrating a user interface to determine an area of an image and a bokeh pattern according to various exemplary embodiments. As illustrated in FIG. 3, the display 120 may display a UI for dividing an area of an image. In other words, the UI for dividing an area of an image may include a plurality of layouts 31, 32, 33, and 34 which are divided in various types. In addition, when one layout among a plurality of layouts is selected, the UI for dividing an area of an image may include a window 30 which divides an area to display a selected layout.

Also, the display 120 may include a touch panel, and the display window 30 may divide an area by user drawing.

Figure 4:
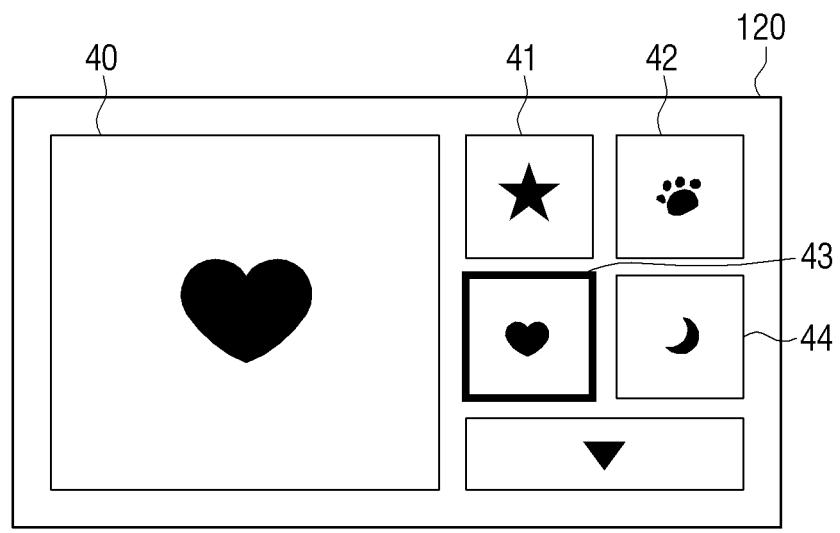

Meanwhile, as illustrated in FIG. 4, the display 120 may display a UI for setting a bokeh pattern. That is, a UI for setting a bokeh pattern may include various types bokeh patterns 41, 42, 43, and 44. For example, when a heart-shaped bokeh pattern 43 is selected from among the bokeh patterns displayed on a UI for setting a bokeh pattern, the display 120 may display highlight on the selected bokeh pattern 43.

In addition, the UI for setting a bokeh pattern may include a window 40 which displays a bokeh pattern selected when one bokeh pattern from among a plurality of bokeh patterns is selected. Therefore, as illustrated above, when a heart-shaped bokeh pattern 43 is selected, the window 40 which displays the selected bokeh pattern may display the heart-shaped bokeh pattern 43.

Meanwhile, the display 120 may include a touch panel, and the display window 40 may receive a bokeh pattern by user drawing. That is, even for a bokeh pattern which the UI for setting a bokeh pattern does not include, the UI for setting a bokeh pattern may receive various bokeh patterns by user drawing.

Figure 5:
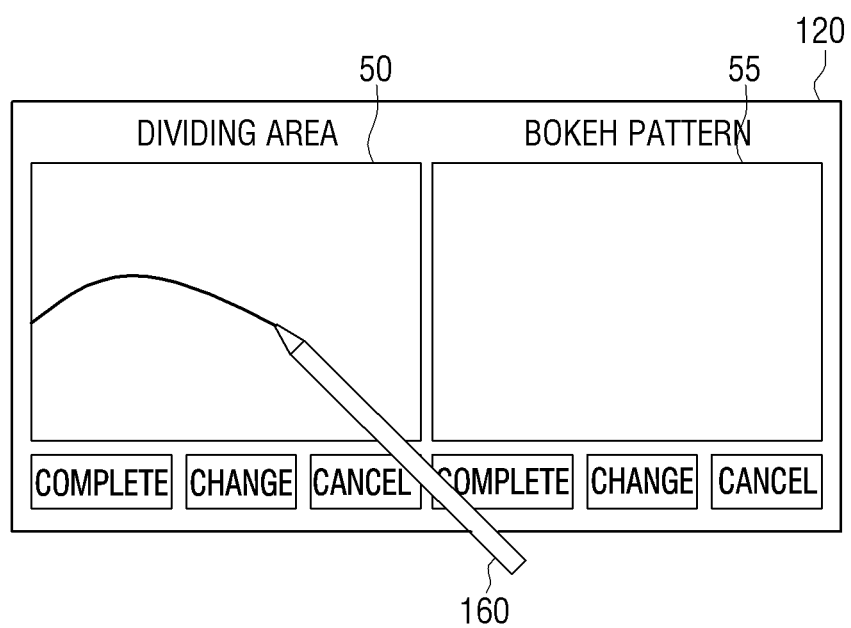

Meanwhile, FIG. 5 is a view which illustrates the case where the display 120 according to an exemplary embodiment displays both a UI for dividing an image area 50 and a UI for setting a bokeh pattern 55.

That is, the display 120 may display the UI 50 which divides an image area in some part, and display the UI 55 for setting a bokeh pattern in another part. In this case as well, the display 120 may include a touch panel, divide an area by user drawing using a user's finger or a touch pen 160, or set a bokeh pattern.

Figure 6:
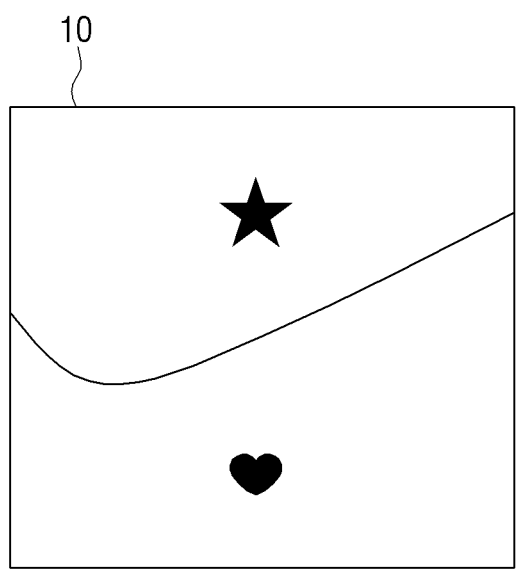

Meanwhile, FIG. 6 is a view which illustrates a case in which an area is divided as illustrated in FIG. 3, and a star-shaped pattern and a heart-shaped pattern are selected as bokeh patterns. When a star-shaped pattern and a heart-shaped pattern are selected as a bokeh pattern, the controller 130 may arbitrarily map each bokeh pattern to a divided area. In addition, the controller 130 may display a UI which receives a location in which a plurality of bokeh patterns are to be mapped. That is, when an image is divided into a plurality of areas, and a plurality of bokeh patterns are selected, the controller 130 may arbitrarily control, or by a user command, that bokeh patterns are mapped to each area.

Figure 7:
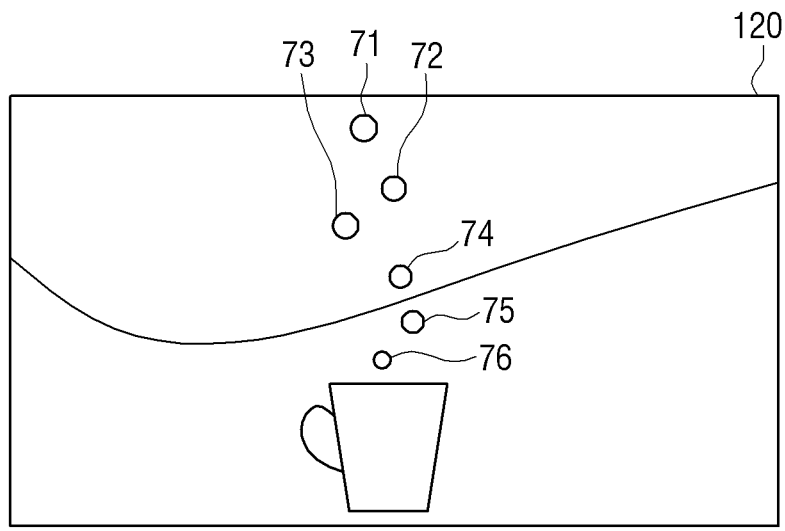
FIGS. 7-8 are views illustrating an image before and after adding a bokeh effect according to an exemplary embodiment.
Figure 8:
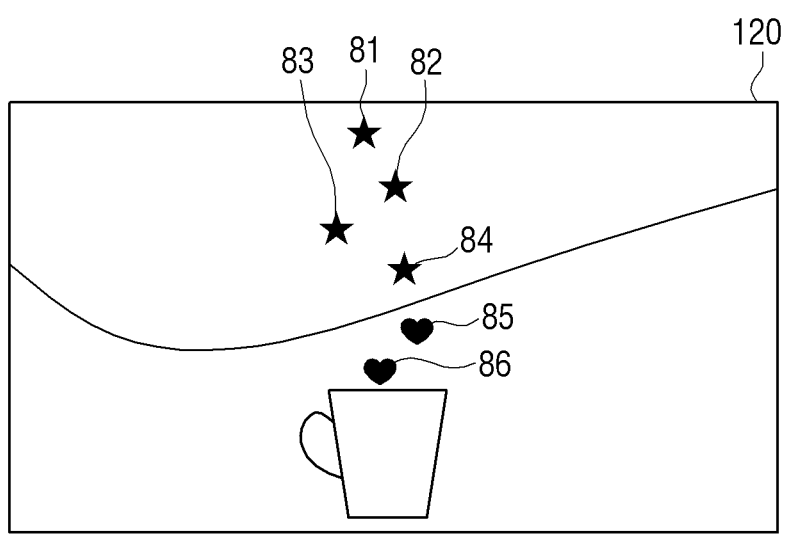

FIGS. 7-8 are views illustrating an image before and after adding a bokeh effect according to an exemplary embodiment. FIG. 7 is a view illustrating an exemplary embodiment of detecting a light point and dividing an area in an image including a bokeh. That is, the image photographing apparatus 100, when a light source is included in the photographed image, may detect each light source 71, 72, 73, 74, 75, and 76.

An algorithm to detect a light source may include an algorithm which changes a received image to a black and white image, detects an overly white area in the image, and determines that this detected overly white area is a light source. In other words, in an algorithm which detects a part of the image changed to white, when changing an image to a black and white image, a part where light is lighter than a preset degree will be changed to white. However, this is merely exemplary, and thus various algorithms which determine and detect light sources from an image may be used.

Each bokeh may have a different size or shape according to quantity of light, focus, size of aperture, etc. For example, the more out of focus the image is, the larger the bokeh may be made, and according to a shape of an aperture, an angulated or round-shaped bokeh may be made.

When the controller 130 detects a light source point, the controller 130 may make a bokeh pattern mapped to each divided area. When a bokeh pattern is mapped, each bokeh will be changed from the angulated or round bokeh to a shape of the mapped bokeh pattern. That is, as illustrated in FIG. 8, each bokeh, by the control of the controller 130, may be mapped to a star-shaped pattern (81, 82, 83, 84) or a heart-shaped pattern (85, 86) from the round shape (71, 72, 73, 74, 75, 76), and displayed.

A bokeh pattern may be mapped at the same time with photographing an image by the photographing unit 110, mapped after capturing an image by a user command, or mapped by the control of the controller 130 by loading an image pre-stored in the storage 150.

Figure 9:
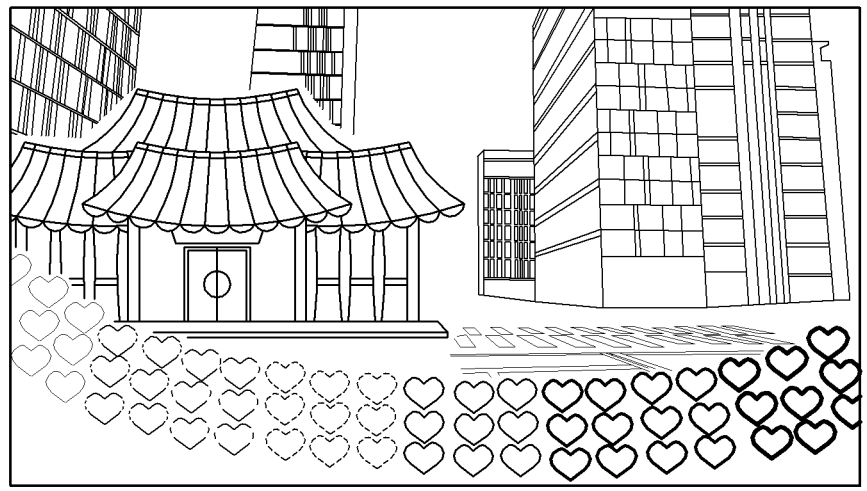
FIG. 9 is a view illustrating an image where a bokeh effect is added when a light source point is formed in a line format, according to an exemplary embodiment.

FIG. 9 is a view illustrating an image where a bokeh effect is added when a light source point is formed in a line format, according to an exemplary embodiment.

For example, when a lens of the photographing unit 110 is exposed for a long time (for example, 5 seconds), the photographing unit 110 may photograph a light source point in a format of a line.

Accordingly, when a lens of the photographing unit 110 is exposed for a long time, the controller 130 may make a bokeh image by detecting a light source point and mapping a bokeh pattern to each light source point, and in this case, a bokeh pattern will be mapped as a line according to the light source point. In this case, in a part where light is comparatively strong, a comparatively greater number of light source points may be detected. In addition, when a detected light source point is mapped to a bokeh pattern, the controller 130 may control that a bokeh may be displayed clearly.

In addition, from the part of the image where light is comparatively weak, a comparatively few number of light source points may be detected, and each detected light source point is mapped to a bokeh pattern, and thus the controller 130 may control that a bokeh pattern can be displayed to be dimmer than the part where light is comparatively strong.

Referring to FIG. 9 which is a view illustrating an image which photographs light of a vehicle passing a front side of a building, a case in which light becomes stronger toward the right side is described, since the number of vehicles increases. Accordingly, when a bokeh image is made in the aforementioned direction, the controller 130 may control so that more light source points are detected toward the right side, and a bokeh pattern is displayed clearly.

In addition, in case of photographing an image where light moves, different bokeh patterns may be mapped to a plurality of divided areas of the image respectively. For example, when an image area is divided into the same size in an up part and a down part, and if it is set that the up part is mapped to a star-shaped pattern and the down part is mapped to a heart-shaped pattern, and light moves from up to down, the controller 130 may control so that patterns set to each area can be mapped to each area of a route where light moves, and a bokeh image may be generated accordingly. That is, when an image is photographed without mapping of a bokeh pattern, only a part of the image where light exists last is photographed, but the controller 130 may control so that patterns of each area are mapped to all the routes where light moves during a preset time or time selected by a user, and a bokeh image is made.

Meanwhile, the aforementioned method for making a bokeh image relates to an exemplary embodiment of a case where there is a user input which divides an image into a plurality of areas, but the controller 130 may automatically determine the plurality of areas according to distance or depth information of an image.

To be specific, even without a user command or a user drawing to select a layout which divides an image into a plurality of areas, the controller 130 may determine areas of an image as an area where distance or depth of an image is greater than a preset value and an area where distance or depth is less than a preset value, according to information of distance or depth of an image.

For example, when photographing an image by using an auto focus mode of the image photographing apparatus 100, the controller 130 may divide areas into an exactly focused area in a preset size as a first area, left side of the first area as a second area, and right side of the first area as a third area, and determine an image as a plurality of areas. That is, in case of using an auto focus mode, based on an exactly-focused area of a photographed image, a perspective of a photographed image may be determined.

Meanwhile, using an auto focus mode to detect distance or depth information is merely an example, and thus there may be another method of detecting distance or depth information of a photographed image.

Figure 10:
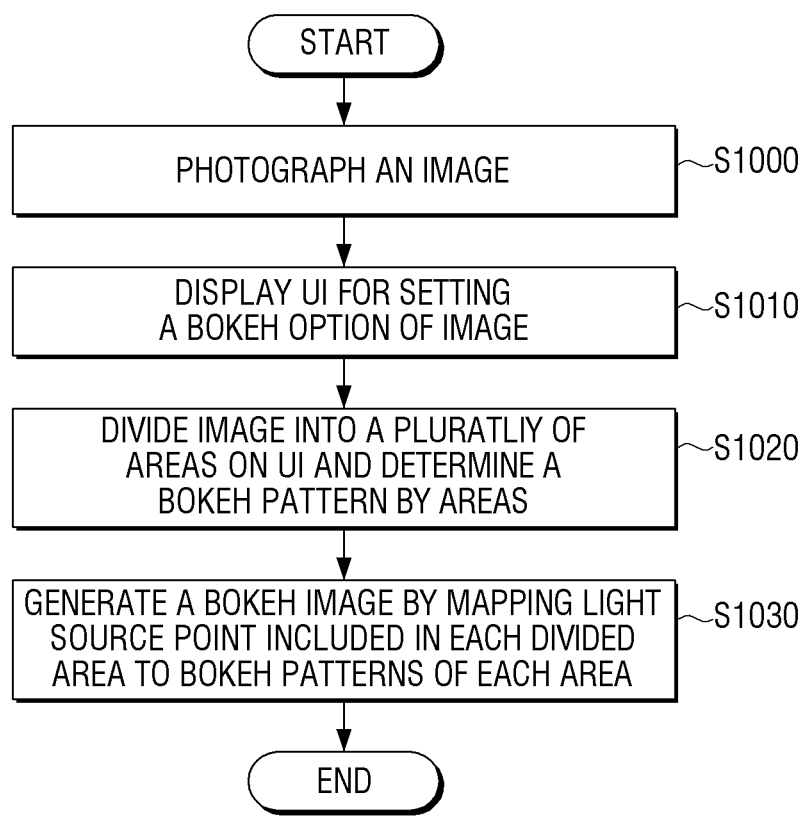
FIGS. 10-11 are flow charts illustrating a method for making a bokeh image of an electronic apparatus according to various exemplary embodiments.
Figure 11:
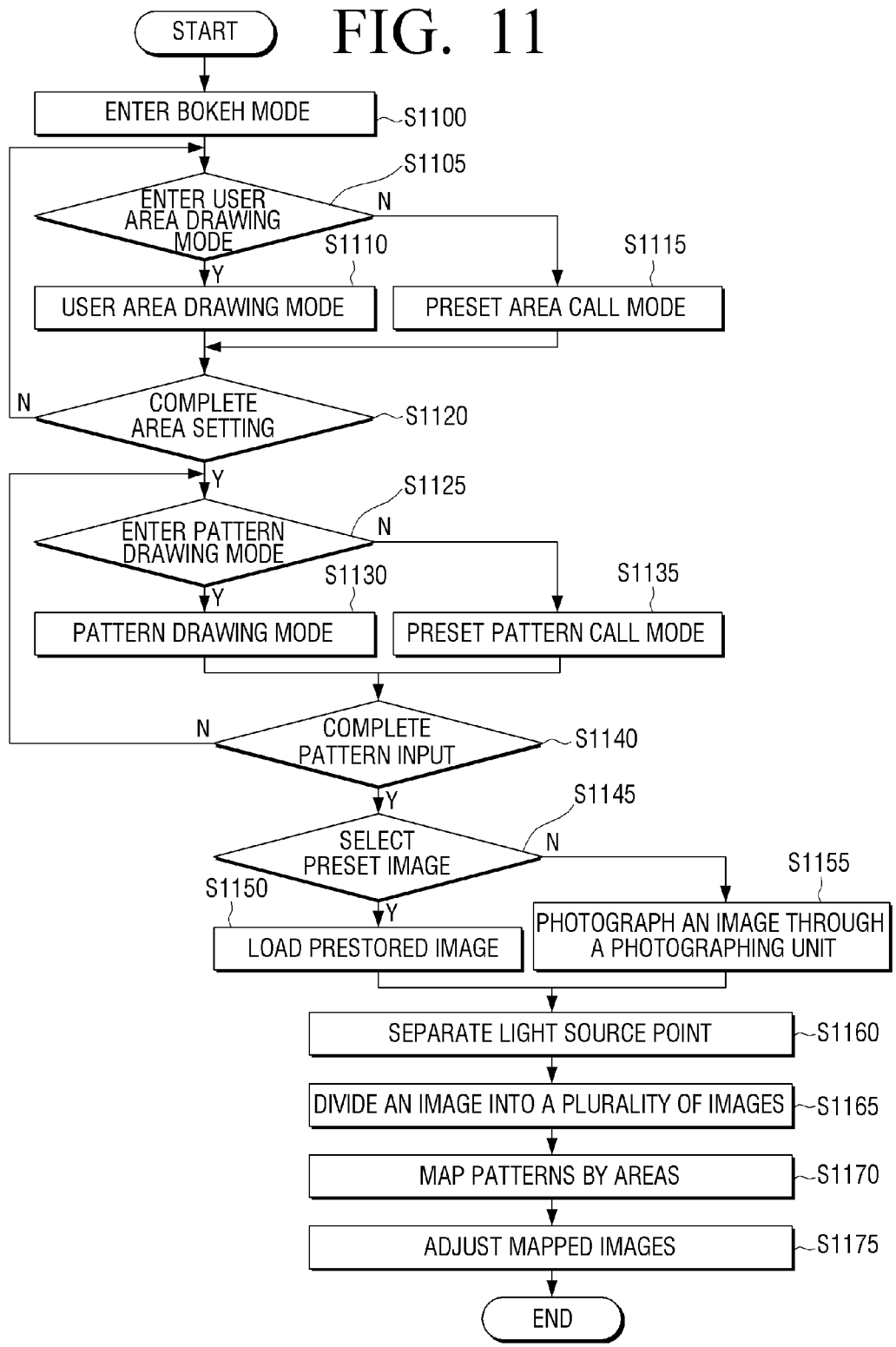

Meanwhile, FIGS. 10-11 are flow charts illustrating a method for making a bokeh image of an electronic apparatus according to various exemplary embodiments.

First of all, in FIG. 10, the image photographing apparatus 100 photographs an image (S1000), and displays the UI for setting a bokeh option (S1010). Herein, the UI for setting a bokeh option may include the UI for dividing an area of the image and the UI for setting a bokeh option. That is, the UI for dividing an area may display a plurality of layouts which divide an image into various formats, and when one of the plurality of layouts is selected by a user, a plurality of areas may be determined in the number and type corresponding to the selected layout.

In addition, the UI for setting a bokeh pattern may display various types of bokeh patterns, and when one of the various types of bokeh patterns is selected by a user, the selected bokeh pattern may be determined as a bokeh pattern corresponding to one of the plurality of areas, for each of the plurality of areas.

In addition, the UI for dividing an area and the UI for setting a bokeh pattern may be realized on a touch panel, and input of division of an area and input of a bokeh pattern may be received by a user drawing using the hand of a user or a touch pen.

Meanwhile, a bokeh pattern may include at least one of a graphic image, a photo, a text, a symbol, and a number. For example, the bokeh pattern can be a graphic image of a shape of a star, heart, crown, or the like; a photo of a person or a figure; or a text such as 'A, B, HAPPY, LOVE' or the like.

When an image is divided into a plurality of areas on a UI, and a bokeh pattern is determined for each area (S1020), a bokeh image is made by mapping light source points included in each divided area to bokeh patterns of each area (S1030). That is, when the light point is detected by various modules, by using a layout which divides an image area received from the UI for setting a bokeh option and a format of a bokeh pattern, a received bokeh pattern is mapped to each light source point and a bokeh image is made.

In the embodiment of FIG. 11, first of all, the image photographing apparatus 100 enters a bokeh mode (S1100). The bokeh mode is a mode to display a UI which divides an image into a plurality of images, enters a bokeh pattern to make a bokeh image, and receives a user command. The bokeh mode may be entered before photographing an image or loading a previously stored image.

Next, whether or not to enter a user area drawing mode is determined (S1105). That is, whether or not to enter a drawing mode which divides an area of an image by user drawing is determined. When it is determined to enter the user area drawing mode (S1105-Y), the user area drawing mode is entered (S1110). In other words, the user area drawing mode means a mode of setting an area of an image in the format of inputting by a user drawing through a touch pad. Therefore, a user may divide an image into various layouts which satisfy needs of a user.

Meanwhile, if it is determined to not enter the user area drawing mode (S1105-N), a preset area call mode is entered (S1115). That is, a plurality of layouts which divide an image into various formats may be displayed, and an area of the image may be divided after one of a plurality of layouts is selected by a user.

When area setting is completed by selection of a user drawing or a preset area (S1120), whether to enter pattern drawing mode is determined (S1125). In other words, whether or not to enter a drawing mode which determines a pattern by user drawing is determined. When it is determined to enter a pattern drawing mode (S1125-Y), the pattern drawing mode is entered (S1130). That is, the pattern drawing mode means a mode of setting a pattern input by a user drawing through a touch pad as a bokeh pattern. Accordingly, a user may input various bokeh patterns which satisfy needs of a user and generate a bokeh image.

Meanwhile, when it is determined to not enter a pattern drawing mode (S1125-N), a preset pattern call mode is entered (S1135). In other words, a plurality of various patterns may be displayed, and at least one of the plurality of patterns may be selected by a user.

When an input of a pattern is completed by a user drawing or selection of a preset pattern (S1140), whether to select a previously stored image is determined (S1145). That is, when the image photographing apparatus 100 includes the storage 150, the storage 150 may receive and store an image from an external apparatus, or store a pre-photographed image through the photographing unit 110.

When a previously stored image is selected (S1145-Y), a previously stored image is loaded (S1150). Meanwhile, if the previously stored image is not selected (S1145-N), an image is photographed through the photographing unit 110 (S1155).

When an image is displayed by loading a previously stored image or photographing an image, a light source point is separated from an image (S1160). In addition, according to an area set by a user drawing or selection of a preset area, an image is divided into a plurality of areas (S1165).

Meanwhile, when an image is divided into a plurality of areas, patterns input by areas are mapped to a light source point which exists in each area (S1170). Finally, the image photographing apparatus 100 may adjust a mapped image (S1175). That is, the image photographing apparatus 100 may provide a user with an improved image by automatically adjusting brightness, sharpness, etc. of an image.

Meanwhile, a bokeh image may be generated, at the same time with photographing an image through the photographing unit 110, by dividing an image according to a layout of a set area, detecting a light source point, and mapping an input pattern to each light source point, but the bokeh image may be made by capturing an image photographed through the photographing unit 110, dividing the captured image according to a layout of a set area, detecting a light source point, and mapping an input pattern to each light source point.

Meanwhile, as described above, a command for setting an area to divide an area of an image may be received, and a pattern may be received, but also, it is possible that an area of an image may be divided after receiving a pattern. Accordingly, with reference to FIGS. 12-13, a method for setting an image and a pattern will be described in higher detail.

Figure 12:
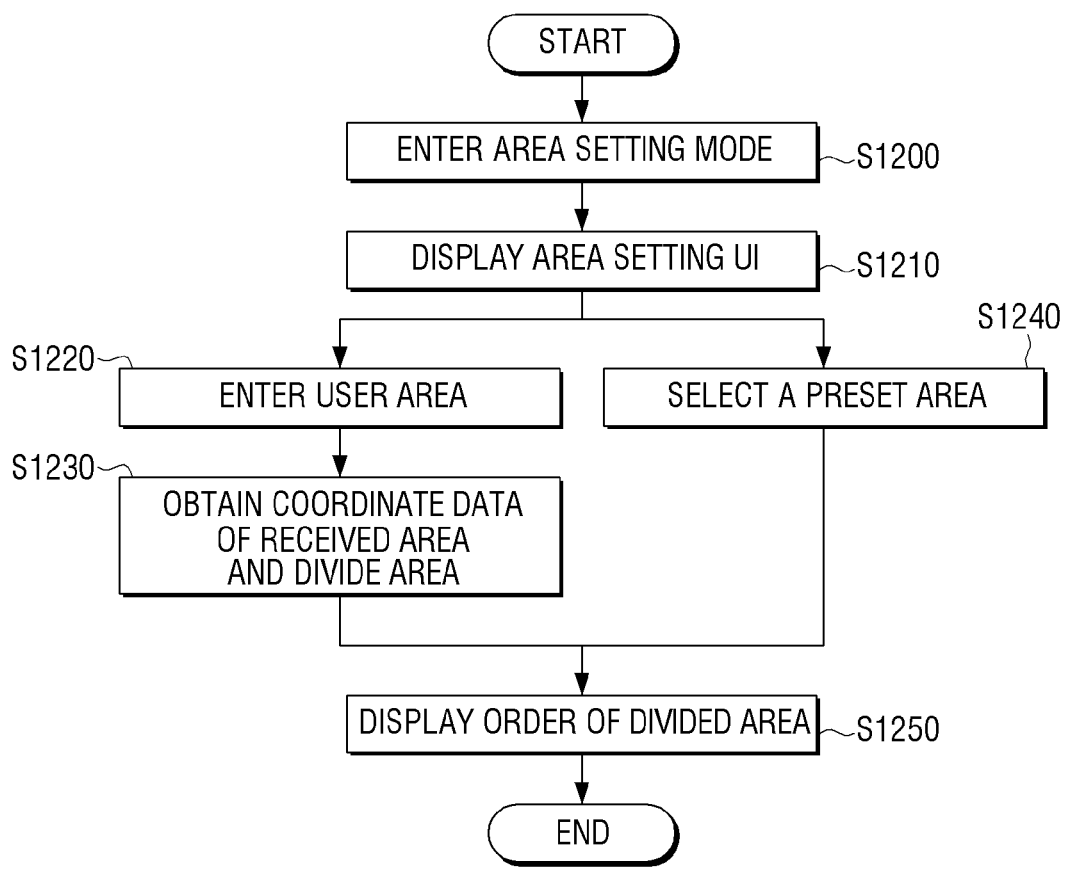
FIG. 12 is a flow chart illustrating a method for setting an area of an image according to an embodiment.

First of all, FIG. 12 is a flow chart illustrating a method for setting an area of an image according to an embodiment. When an area setting mode is entered (S1200), a UI for setting an area is displayed (S1210).

According to initial setting of the image photographing apparatus 100 or a user's selection, a user may enter an area of an image (S1220), and a preset area of an image may be selected (S1240).

In other words, a UI for setting an area of an image is a UI which displays a plurality of layouts to divide an image into various types. When one of the plurality of layouts is selected by a user, the UI divides the image into a plurality of areas in the number and format corresponding to the selected layout. In addition, a UI for setting an area of an image may be realized on a touch panel, and setting of an area of an image may be received by a user drawing. That is, the UI may receive a user drawing by using the finger of a user or the touch pen 160 provided outside the image photographing apparatus 100. When a user area is received by a user drawing, a coordinate data of the received area may be obtained and an area may be divided (S1230).

When division of an area is completed by a user drawing or selection of a preset area, the order of the divided area is displayed (S1250). That is, the order of the divided area may be displayed by initial setting of the image photographing apparatus 100. Meanwhile, in order to map a bokeh pattern input by a user to an area which a user wants, the order of the divided area may change.

Figure 13:
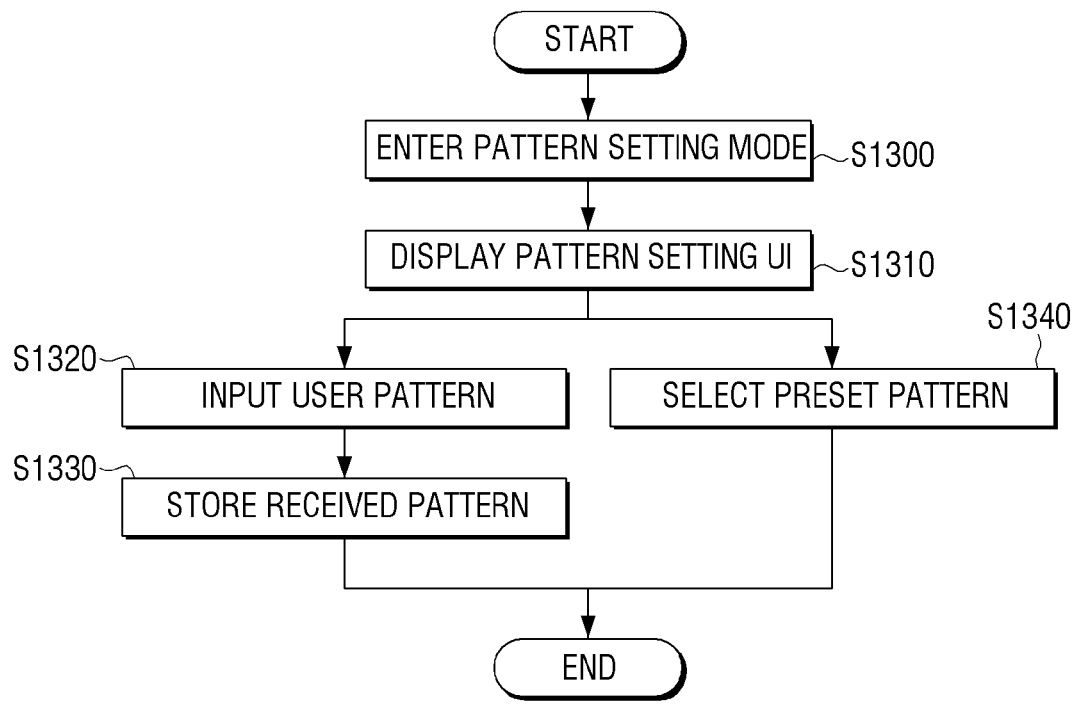
FIG. 13 is a flow chart illustrating a method for setting a pattern according to an embodiment.

Meanwhile, FIG. 13 is a flow chart which illustrates a method for setting a bokeh pattern according to an embodiment. When a pattern setting mode is entered (S1300), a UI for setting a pattern is displayed (S1310).

According to initial setting of the image photographing apparatus 100 or a user's selection, a user may input a pattern (S1320), and select a preset pattern (S1340).

That is, a UI for setting a pattern is a UI to display a plurality of patterns in various formats and to receive at least one of a plurality of patterns from a user. In addition, a UI for setting a pattern may be realized on a touch panel, and a pattern may be input by user drawing. That is, a UI may receive a pattern by user drawing by using the finger of a user, the touch pen 160 provided outside the image photographing apparatus 100, or the like. When a pattern is input by user drawing, the input pattern may be stored (S1330). That is, when the image photographing apparatus 100 includes the storage 150, the storage 150 may store the input pattern by user drawing, and the controller 130 may control so that the stored pattern can be reused. The pattern setting mode is ended by a user drawing or selection of a preset pattern.

As described above, according to various exemplary embodiments, a user may divide an image into a plurality of areas, input a bokeh pattern to be mapped to each area, and make a bokeh image where an image is mapped to various bokeh patterns.

Meanwhile, a method for making a bokeh image of the electronic apparatus according to aforementioned various exemplary embodiments may be coded with software and stored in non-transitory readable medium. Such non-transitory readable medium may be mounted to various apparatuses and used.

The non-transitory recordable medium refers to a medium which may store data semi-permanently rather than storing data for a short time such as a register, a cache, and a memory and may be readable by an apparatus. Specifically, the above-mentioned various applications or programs may be stored in a non-temporal recordable medium such as CD, DVD, hard disk, Blu-ray disk, USB, memory card, and ROM and provided therein.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a computer-readable media such as non-transitory magnetic storage media (e.g., magnetic tapes, hard disks, floppy disks), non-transitory optical recording media (e.g., CD-ROMs, Digital Versatile Discs (DVDs), etc.), and non-transitory solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. An electronic apparatus, comprising:
    an image photographing unit configured to photograph an image;
    a display configured to display a user interface (UI) to set a bokeh option on the image; and
    a controller configured to, when the image is divided into a plurality of areas on the UI, and a bokeh pattern is determined for each of the plurality of areas, generate a bokeh image by mapping the bokeh pattern determined for each of the plurality of areas to a light source point included in the respective each of the plurality of areas, wherein
    in an instance where the light source moves across the plurality of areas, the controller is configured to generate the bokeh image by mapping the bokeh pattern of each of the plurality of areas to each of the plurality of areas where the light source moves during a preset time.

2. The apparatus as claimed in claim 1, wherein the UI comprises a first UI part which displays a plurality of layouts and a second UI part which receives a selection of the bokeh pattern,
    wherein the controller, in response to one layout selected from among the plurality of layouts at the first UI part, determines the plurality of areas based on a number and type corresponding to the selected layout, and
    in response to a plurality of bokeh patterns selected at the second UI part, determines each selected bokeh pattern as a bokeh pattern determined for at least one of each of the plurality of areas.

3. The apparatus as claimed in claim 1, wherein the UI comprises a UI part capable of user drawing,
    wherein the controller, in response to a first user drawing to divide the image performed at the UI part, divides the image into the plurality of areas according to a first user drawing trace, and
    in response to a second user drawing to draw a pattern performed at the UI part, determines the pattern drawn by the second user drawing as the bokeh pattern.

4. The apparatus as claimed in claim 3, further comprising:
    a storage;

wherein the controller stores area division information determined by the first user drawing and bokeh pattern information determined by the second user drawing in the storage.

5. The apparatus as claimed in claim 4, further comprising:
a communicator that performs communication with an external apparatus;
wherein the controller transmits the area division information and the bokeh pattern information stored in the storage to the external apparatus.

6. The apparatus as claimed in claim 1, wherein the controller, in response to a light source point being in a format of a line, maps the bokeh pattern as a plurality of bokeh patterns according to the format of the line, and gradually changes transparency of the plurality of bokeh patterns according to brightness of the light source point along the format of the line.

7. The apparatus as claimed in claim 1, wherein the controller automatically determines the plurality of areas according to any information of the image selected from the group consisting of distance information and depth information.

8. The apparatus as claimed in claim 1, wherein the bokeh pattern comprises at least one pattern selected from the group consisting of a graphic image, a photo, a text, a symbol, and a number.

9. A method of making a bokeh image, the method comprising:
photographing an image;
displaying a user interface (UI) to set a bokeh option on the image;
dividing the image into a plurality of areas on the UI;
determining a bokeh pattern for each of the plurality of areas; and
generating a bokeh image by mapping the bokeh pattern determined for each of the plurality of areas to a light source point included in the respective each of the plurality of areas, wherein
in an instance where the light source moves across the plurality of areas, generating the bokeh image by mapping the bokeh pattern of each of the plurality of areas to each of the plurality of areas where the light source moves during a preset time.

10. The method as claimed in claim 9, wherein the UI comprises a first UI part which displays a plurality of layouts and a second UI part which receives a selection of the bokeh pattern,
wherein the determining comprises, in response to one layout selected from among the plurality of layouts at the first UI part, determining the plurality of areas based on a number and type corresponding to the selected layout, and
in response to a plurality of bokeh patterns selected at the second UI part, determining each selected bokeh pattern as a bokeh pattern determined for at least one of each of the plurality of areas.

11. The method as claimed in claim 9, wherein the UI comprises a UI part capable of user drawing,
wherein the determining comprises, in response to a first user drawing to divide the image performed at the UI part, dividing the image into the plurality of areas according to a first user drawing trace, and
in response to a second user drawing to draw a pattern performed at the UI part, determining the pattern drawn by the second user drawing as the bokeh pattern.

12. The method as claimed in claim 11, further comprising:
storing area division information determined by the first user drawing and bokeh pattern information determined by the second user drawing.

13. The method as claimed in claim 12, further comprising:
transmitting the stored area division information and the bokeh pattern information to the external apparatus.

14. The method as claimed in claim 9, wherein the generating the bokeh image comprises, in response to a light source point being in a format of a line, mapping the bokeh pattern as a plurality of bokeh patterns according to the format of the line, and gradually changing transparency of the plurality of bokeh patterns according to brightness of the light source point along the format of the line.

15. The method as claimed in claim 9, wherein the determining comprises automatically determining the plurality of areas according to any information of the image selected from the group consisting of distance information and depth information.

16. The method as claimed in claim 9, wherein the bokeh pattern comprises at least one pattern selected from the group consisting of a graphic image, a photo, a text, a symbol, and a number.

* * * * *